United States Patent [19]

Harmon et al.

[11] Patent Number: 4,989,433
[45] Date of Patent: Feb. 5, 1991

[54] METHOD AND MEANS FOR METAL SIZING EMPLOYING THERMAL EXPANSION AND CONTRACTION

[76] Inventors: John L. Harmon, 450 Appleton Way, Wilmington, N.C. 28403; Charles Schiltz, 214 N. Channel Dr., Wilmington, N.C. 28480; Gerald W. McKenzie, 309 Lansdowne Rd., Wilmington, N.C. 28403

[21] Appl. No.: 317,244

[22] Filed: Feb. 28, 1989

[51] Int. Cl.$^5$ .............................................. B21D 39/20
[52] U.S. Cl. ........................................ 72/38; 72/342.4; 72/342.7
[58] Field of Search .............. 72/38, 342, 342.4, 342.7

[56] References Cited

U.S. PATENT DOCUMENTS

| | | | |
|---|---|---|---|
| 2,944,500 | 7/1960 | Raynes | 72/342 |
| 3,315,513 | 4/1967 | Ellenburg | 72/342 |
| 3,383,900 | 5/1968 | Van Hartesveldt | 72/342 |
| 3,495,434 | 2/1970 | Lavine | 72/342 |
| 4,604,785 | 8/1986 | Eddens | 72/342 |

Primary Examiner—Lowell A. Larson
Attorney, Agent, or Firm—Robert R. Schroeder

[57] ABSTRACT

An improved method and means for sizing metal configuration through the application of thermal expansion and contraction of a shaping mandrel. The thermally induced changes in the shaping mandrel are produced from within the body at the mandrel.

26 Claims, 1 Drawing Sheet

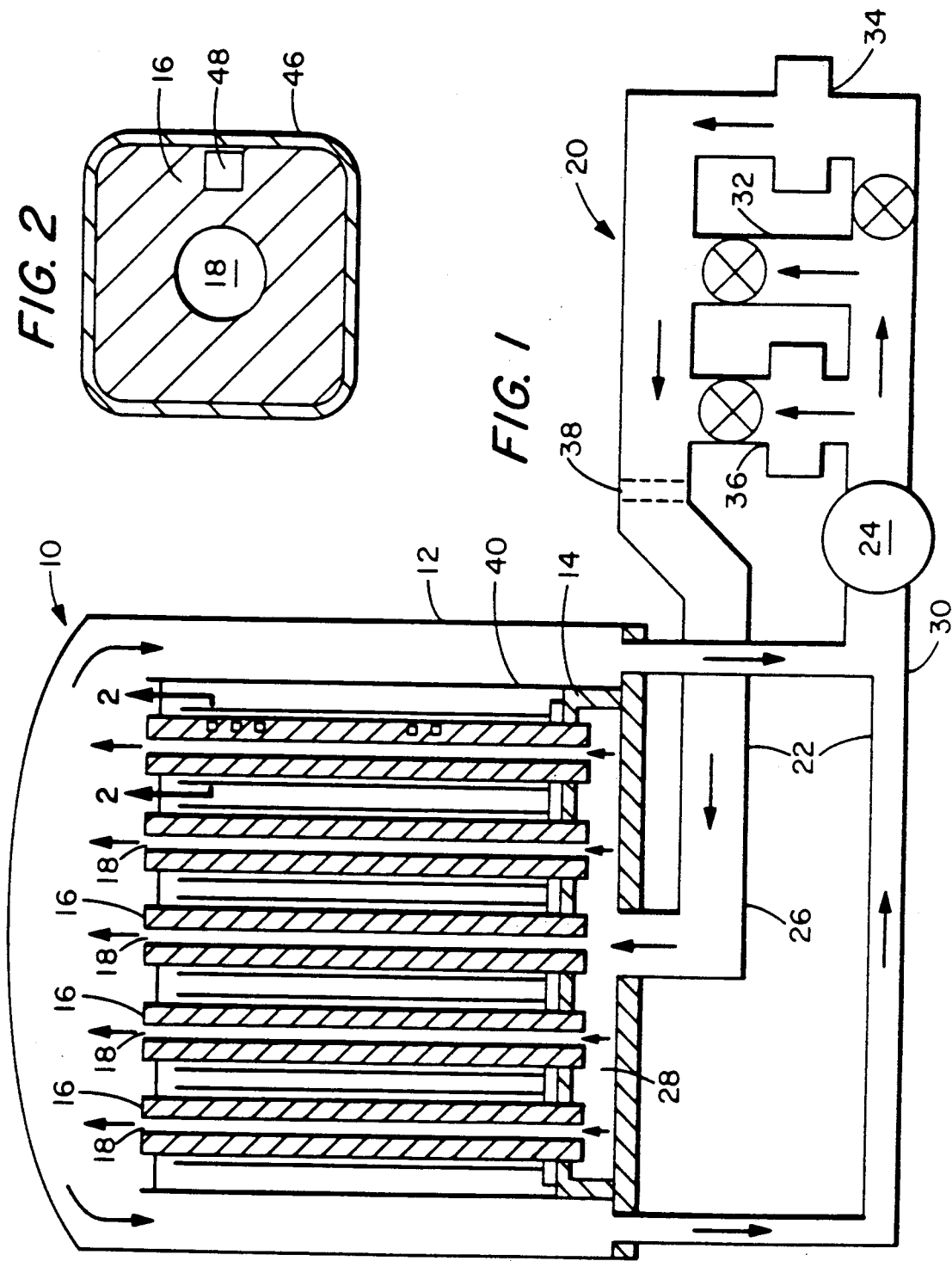

METHOD AND MEANS FOR METAL SIZING EMPLOYING THERMAL EXPANSION AND CONTRACTION

FIELD OF THE INVENTION

This invention deals with sizing or stretching metal components of certain configurations to precise dimensions and contours, free of distortions or nonsymmetry without residual stressing from prior fabrication steps.

The invention is particularly concerned with the production of open-ended, metal circumferential enclosures of either angular or curved cross-sections, comprising for example multi-angled or rectangular, and circular or oval ducts or channels, suitable for use as a component of fuel assemblies for service in nuclear fission reactors.

BACKGROUND OF THE INVENTION

A common fuel assembly design providing the fissionable fuel core for power generating, water cooled nuclear reactors comprises a multiplicity of so-called "bundles", or composite units of interconnected containers of fuel, which are assembled in predetermined patterns. Each bundle typically comprises a group of sealed tubes or elongated container partially filled with fissionable fuel materials, which are aligned parallel and spaced apart from each other in a given design. Bottom and top mountings, and intermediate spacer devices fix the relative positions of the fuel container array. Each such group of fuel containers and their securing devices is surrounded with an open-ended metal circumferential enclosure, referred to in the industry as a "channel". Channels for fuel containers most commonly are square in cross-section for service in power generating, water cooled and moderated nuclear reactors, although they can be of any given cross-section, for example hexagonal for some liquid metal cooled reactors.

A detailed illustration of a typical fuel channel of generally square cross-section, comprising an elongated circumferential enclosure surrounding a group of fuel tubes or rods and forming a bundle, is illustrated in U.S. Pat. Nos. 3,350,275, and 3,689,358 issued Oct. 31, 1967 and Sept. 5, 1972, respectively. The disclosed contents of these patents are accordingly incorporated herein by reference.

Such fuel bundle channel units are commonly fabricated by bending both longitudinal edges of an elongated strip of metal into a U-shape piece. Then two U-shaped pieces are matched together with their longitudinal edges adjoining and welded along each of the adjoined longitudinal edge to unite the two half pieces into a unitary open-ended, circumferential enclosure. The typical channel unit is of generally square cross-section with four equal sides, for example about 6 inches across, produced by uniting two elongated half sections, each formed from a single metal strip.

A substantially inevitable aspect of such a fabrication process is that the resulting product, namely a long, open-ended metal square or rectangular duct, is typically somewhat distorted and not precisely symmetrical, and lacks accurate and uniform dimensions with deviating flatness of surfaces.

In the channel units designated functions as a component of fuel bundles for service in the fuel core assembly of nuclear reactors, accuracy of dimensions, good symmetry, and a distortion free configuration with flat plane surfaces are all highly significant requirements.

Exposure of the channels in a reactor to high and uneven levels of radiation and heat with the resultant potential for deformation due to relaxation of residual stresses is amplified by the neutron irradiation encountered within a nuclear reactor. These changes can distort tolerances which are required for the interaction of fuel core components, such as control rods, in reactor operation. Moreover, the necessary securing of a channel unit at several locations of its body to other components, coupled with these inevitable dimensional changes, compounds the distortion and may extend the effect to other components.

SUMMARY OF THE INVENTION

This invention comprises a unique method and apparatus for sizing open-ended, metal circumferential enclosures comprising ducts of angular or curving cross-section to accurate and symmetrical configurations of precise dimensions, while at the same time rendering them free of residual stresses. The invention includes the utilization of a precision shaping mandrel having a relatively greater coefficient of thermal expansion than the metal being sized whereby the circumferential enclosure is stretched from within to the desired shape and dimensions by the expansion of the sizing and shaping mandrel positioned within the enclosure.

OBJECTS OF THE INVENTION

It is a primary object of this invention to provide an improved method, and apparatus therefor, for sizing metal objects comprising open-ended circumferential enclosures such as ducts or channels of various cross-sections.

It is also an object of this invention to provide a unique method and means for accurately shaping open-ended circumferential enclosures to symmetrical cross-sectional configurations of precise dimensions and flat plane surfaces It is another object of this invention to provide measures for rendering the produced metal shape free of residual stresses in a minimum amount of time, thus preserving other inherent, desirable metallurgical qualities of the metal.

It is a further object of this invention to provide a method and means for sizing open-ended circumferential enclosures, including annealing of the sized metal item, which is of reduced time with respect to conventional methods.

It is a still further object of this invention to provide an improved method and apparatus for sizing channel units for use in fuel bundles for nuclear reactor fuel core assemblies.

BRIEF DESCRIPTION OF THE DRAWINGS

FIG. 1 of the drawing comprises a diagrammatic cross-sectional view illustrating an apparatus for carrying out the sizing method of this inventions; and FIG. 2 of the drawing comprises a cross-sectional view taken along the line 2—2 of FIG. 1 illustrating a sizing mandrel with a work piece installed thereon for sizing and shaping.

DETAILED DESCRIPTION OF THE INVENTION

This invention comprises improvements in the technique and means for sizing and/or shaping metal bodies with an internal mandrel or stretching device which utilized the phenomenon of thermal expansion and contraction to apply force. Specifically one means for shaping and/or sizing objects of given configurations, is to apply the material or work piece for shaping around a mandrel of a composition having a significantly higher coefficient of thermal expansion than the material to be shaped. Then, upon the application of sufficient heat to the mandrel, and the adjoining material or work piece to be shaped, the greater expansion of the former stretches the latter into a shape and dimension(s) conforming to the configuration of exterior surfaces at the mandrel.

In accordance with an aspect of the improvement of this invention, the temperature conditions of the mandrel shaping and/or sizing means having a relatively high coefficient of thermal expansion are applied and manipulated from within the mandrel. Preferably a temperature modifying fluid, such as an inert gas or liquid, is passed through a core duct of each mandrel unit at high volume rates to either heat or cool, as desired or required. For example, internal mandrel core fluid flow rates should comprise at least about 500 cubic feet per minute, and preferably approximately 2000 cubic feet per minute.

The sizing and/or shaping mandrel is constructed of any strong, rigid material of high tensile strength at elevated temperatures having good thermal conductivity and a relatively high coefficient of thermal expression with respect to the coefficient of expansion of the material or work piece to be sized or shaped. For example, stainless steel is a preferred composition for the sizing mandrel, whereas channel units to be sized are typically comprised of zirconium metal or zirconium alloys. The exterior surface configuration of the mandrel of course should be of the dimensions, shape and contours to be imposed upon the work piece to be sized and/or shaped.

Specifically, this invention is directed to the sizing and/or shaping of metal bodies which comprise open-ended, elongated circumferential enclosures, including, for example, sections of conduit, tube, pipe, or the like of various cross-sectional sizes and configurations. For instance the enclosures can be angular in cross-section such as generally square, rectangular, triangular, etc., or of substantially any multisided configuration, as well as curving such as circular or oval. However, the invention is particularly directed to the production of channel units to be used in fuel bundles for service in fuel core assemblies of nuclear reactors. Such channel units commonly comprise elongated hollow, open-ended, square sections with rounded corners of small radius. A typical channel may be about 14 feet long and about 6 inches wide, having four flat surfaces of about 6 inches in width, depending, of course, upon the reactor fuel core design. Such channels, as noted, are normally produced by joining two lengthwise U-shaped half sections by welding the length of both longitudinal seams. Such a produced unit is frequently distorted and lacks precision of dimensions and symmetry of shape.

Practice of the improved method of the invention comprises inserting a suitable configurated mandrel into a work piece comprising a metal circumferential enclosure, such as a channel unit blank, whereby the mandrel extends the full length of the work piece. This step of course can likewise be achieved by sliding the open-ended enclosure such as channel unit blank over an end of the mandrel until the mandrel extends therethrough.

In some instances it may be appropriate or feasible to significantly cool the mandrel to contract its overall mass to facilitate the application of the mandrel through the interior of the enclosure work piece. The relative differences in the thermal coefficient of expansion for the materials of the two components may be a factor in this option of the invention. In any case, this invention provides effective means for modifying temperature condition of the mandrel, either up or down and in turn its expansion or contraction in mass.

Following mounting the circumferential enclosure work piece surrounding the sizing mandrel, the mandrel is internally heated and thereby expanded to a dimension or overall size exceeding the internal dimension or size of the enclosure work piece. This outward pressing by the mandrel impresses its external dimensions, configuration and/or contours into the interior of the enclosure work piece whereby it can be shaped into a symmetrical or uniformly shaped body of desired dimensions. When the annealing temperature for the metal is attained, the stresses resulting from prior fabrication steps as well as those resulting from the stretching-shaping are all relaxed which causes the piece to conform to the mandrel-mold in a stress free condition. Of course, the designed dimensions of the sizing mandrel must take into consideration the dimensional aspects of expansion and contraction upon cooling whereby the accurate dimensions required in the work piece well be achieved upon its arriving at ambient temperature conditions.

Due to the generally high thermal conductivity of metals, the increased temperatures provided within the shaping mandrel to induce expansion, will at least in part be transferred to the enclosure stock piece undergoing sizing. This increase in temperature and in turn increased ductility, facilitates sizing and/or shaping of the enclosure work piece. Additionally, it is frequently appropriate to anneal the newly sized and/or shaped piece to relieve stresses within the metal which may have been introduced by the forced sizing and/or shaping thereof. Annealing of the newly worked metal can be conveniently and effectively achieved by simply retaining the sized and/or reshaped circumferential enclosure work piece in position surrounding the heated mandrel for a period and at a temperature sufficient to effect a suitable thermal annealing of its metal mass.

Upon completing the thermal expansion sizing and/or shaping, and heat annealing when appropriate, the procedure usually can be expedited by internally cooling the sizing mandrel to contract its mass contained within the surrounding circumferential enclosure. The mandrel and the sized enclosure work piece are thus effectively separated and the sized enclosure work piece released for easy removal from about the mandrel.

Referring to the drawings, in particular FIG. 1, the preferred sizing apparatus 10 of this invention comprises a closed chamber 12 with a suitable access means for the introduction and removal of the work pieces. Chamber 12 is provided with a base 14 for supporting and securing at least one, and preferably a multiplicity of sizing mandrels 16 of suitable cross-sectional design and length. It is preferred that the sizing mandrels 16 be supported generally vertical, positioned at their lower end, to facilitate application and removal of the surrounding work piece as well as minimizing their mounting structure.

Each sizing mandrel 16 is provided with at least one internal duct 18 extending through the length thereof for the passage of a temperature modifying fluid therethrough to manipulate the temperature of the mandrel and in turn its exterior dimensions. The mandrel duct 18 opens at its unsupported end out into the chamber 12.

The sizing apparatus 10, comprises a system 20 for circulating the temperature modifying fluid thorough the sizing mandrels 16 and the chamber 12, and continuously recycling the fluid through the sizing and/or shaping, and if appropriate annealing, steps. Fluid circulating system 20 comprises circuit conduit 22 for recycling the temperature modifying fluid into the duct 18 of the sizing mandrel 16, and from chamber 12 back into duct 18. Circuit conduit 22 of the fluid circulating system comprises a fluid propelling means 24, such as a pump or fan, for impelling the fluid through its recycling circuit. Circuit conduit 22 includes a fluid entry conduit 26 which leads from the circuit conduit 22 into a fluid manifold 28 for distributing the circulating temperature modifying fluid from the system 20 to the duct 18 of each sizing mandrel 16. Circuit conduit 22 also includes a fluid exit conduit 30 with carries the circulating temperature modifying fluid from the chamber 12 back into the circulating system 20.

The circuit conduit 22 of the circulating system 20, further comprises a fluid by-pass and valve 32 for regulating flow, a fluid heater and valve 34 branch and a fluid cooler and valve 36 branch to modify and control the temperature at the temperature modifying fluid for circulating through duct 18 of sizing mandrels 16. Preferably a fluid filter 38 is provided in the circuit conduit 22 at the circulating system 20 to remove potentially deleterious material or contaminants.

A shroud 40 is preferably provided in the chamber 12 surrounding the sizing mandrel(s) 16 to shield the mandrel(s) from radiant exposure to any heat source or heat sink and potentially non-uniform convection fluid flow along the walls of the chamber 12. Additional preferred optional features of the apparatus which contribute to its versatility in operation and performance in sizing, comprises providing electrical heating means within the sizing mandrels 16 as a supplemental or alternative heating means for carrying out the method, and/or providing heating units, such as electrical coils, mounted on the walls of the chamber 14 or as a separate heating unit external to chamber 12. Also temperature sensing and measuring devices 48 can be provided within the mandrels 16.

FIG. 2 of the drawing illustrates a work piece enclosure 46, comprising a rectangular fuel bundle channel unit, with a shaping mandrel 16 of this invention inserted therethrough for carrying out the sizing method through thermal expansion and contraction as produced by a temperature modifying fluid passing along duct 18.

What is claimed is:

1. A method of sizing an open-ended, metal circumferential enclosure, consisting essentially of the steps of:
    (a) inserting a close fitting metal mandrel having an aptly and accurately shaped body through the length of an open-ended, metal circumferential enclosure whereby the enclosure surrounds a portion of the mandrel and the mandrel extends through the open-ended enclosure, said mandrel being constructed of a metal having a coefficient of thermal expansions substantially greater than the metal of the surrounding open-ended enclosure and being provided with internal cooling and heating means;
    (b) heating the inserted metal mandrel to expand its shaped body to a dimension exceeding the internal dimension of the surrounding open-ended enclosure and thereby internally stretching the open-ended enclosure outward to an imposed accurate shape;
    (c) retaining a level of heat until the stretch shaped circumferential open-ended enclosure is annealed while in the stretch imposed shape; and
    (d) cooling the inserted metal mandrel to contract its shaped body to its initial dimension of smaller than the enclosure and withdrawing the mandrel from the shaped open-ended enclosure.

2. The method of sizing of claim 1, wherein the open-ended, metal circumferential enclosure is angular in cross-section.

3. The method of sizing of claim 1, wherein the open-ended metal circumferential enclosure is generally square in cross-section.

4. The method of sizing of claim 1, wherein the open-ended metal circumferential enclosure is generally curving in cross-section.

5. The method of sizing of claim 1, wherein the open-ended metal circumferential enclosure is a channel of generally square cross-section for enclosing a bundle comprising containers of fissionable fuel for nuclear reactor service.

6. The method of sizing of claim 1, wherein the close fitting metal mandrel is initially cooled to contract its shaped body to facilitate its insertion into and through the length of the open-ended, metal circumferential enclosure.

7. The method of sizing of claim 1, wherein the metal mandrel is cooled and heated by passing a temperature modifying fluid through its interior.

8. The method of sizing of claim 1, where the metal mandrel is heated with electrical heating means.

9. The method of sizing of claim 1, wherein the open-ended, metal circumferential enclosure is composed of an alloy of zirconium metal.

10. A method of sizing an open-ended, metal circumferential enclosure having an angular cross-section consisting essentially of the steps of:
    (a) inserting a close fitting metal mandrel having an aptly and accurately shaped body of angular cross-section through the length of an open-ended, elongated metal circumferential enclosure of angular cross-section whereby the enclosure surrounds a portion of the mandrel and the mandrel extends through the length of the open-ended enclosure, said mandrel being constructed of a metal having a coefficient of thermal expansion substantially greater than the metal of the surrounding open-ended enclosure, and said mandrel being provided with internal cooling and heating means including the flow of a temperature modifying fluid;
    (b) heating the inserted metal mandrel with an internal flow of a heated fluid to expand its shaped body to a dimension exceeding the initial internal dimension of the surrounding open-ended enclosure and thereby internally stretching the enclosure outward to an imposed accurate shape;
    (c) retaining a level of heat until the stretch shaped circumferential enclosure is thermally annealed while in the stretch imposed shape; and
    (d) cooling the inserted metal mandrel with an internal flow of cooled fluid to contact its shaped body to its initial dimension of smaller than the open-ended enclosure, and withdrawing the mandrel from the shaped enclosure.

11. The method of sizing of claim 10, wherein the open-ended metal circumferential enclosure is a channel of generally square cross-section for enclosing a bundle comprising containers of fissionable fuel for nuclear reactor service.

12. The method of sizing of claim 10, wherein the open-ended metal circumferential enclosure is composed of an alloy of zirconium metal and the mandrel is composed of a stainless steel alloy.

13. The method of sizing of claim 10, wherein the heating and annealing steps are carried out within an enclosure provided with a protective non-oxidizing atmosphere.

14. The method of sizing of claim 10, wherein the open-ended metal circumferential enclosure with the inserted metal mandrel is heated by means of external heat sources.

15. A method of sizing an open-ended, zirconium alloy metal circumferential enclosure consisting of a channel having a generally square cross-section, consisting essentially of the steps of:
(a) inserting a close fitting metal mandrel having an aptly and accurately shaped elongated body of generally square cross-section through the length of an open-ended, elongated metal circumferential enclosure consisting of a nuclear reactor fuel channel whereby the open-ended channel enclosure surrounds the mandrel and the mandrel extends through the length of the open-ended channel, said mandrel being constructed of a metal having a coefficient of thermal expansion substantially greater than the metal of the surrounding open-ended channel enclosure, and said mandrel being provided with internal cooling and heating means including a duct for the flow therethrough of a temperature modifying fluids;
(b) heating the inserted metal mandrel to expand its shaped body to a dimension exceeding the initial internal dimension of the surrounding open-ended channel enclosure and thereby internally stretching the channel enclosure outward to an imposed accurate shape;
(c) retaining a level of heat in the channel enclosure until the stretch shaped channel enclosure is thermally annealed while held in the stretch imposed shape; and
(d) cooling the inserted metal mandrel with a flow of cooling fluid to contract its heat expanded shaped body to its initial dimension of small than the open-ended channel enclosure, and withdrawing the mandrel from the shaped channel enclosure.

16. The method of sizing of claims 15, wherein the open-ended metal circumferential channel enclosure comprises an alloy of zirconium metal and the mandrel comprises a stainless steel alloy.

17. The method of sizing of claim 15, wherein the heating and annealing steps are carried out within an enclosure provided with a protective non-oxidizing atmosphere.

18. The method of sizing of claim 15, wherein the open-ended metal circumferential channel enclosure with the inserted mandrel is supplied with auxiliary heat provided by a hear source external to the mandrel.

19. The method of sizing of claim 15, wherein temperature and modifying fluid comprises an inert gas.

20. An apparatus for accurately sizing open-ended metal circumferential enclosures, consisting essentially of the combination of:
(a) a chamber for heating and cooling;
(b) at least one aptly and accurately shaped sizing mandrel enclosed within said chamber and fixed therein at one end supported generally vertical, said sizing mandrel having at least one duct passing through its interior to provide a passage for a temperature modifying fluid whereby the mandrel can be cooled to contract its shaped body and heated to expand its shaped body;
(c) a system for circulating a temperature modifying fluid through said sizing mandrel including a circulating conduit in fluid connection with the duct passing through the sizing mandrel and having a fluid flow propelling means and cooling and heating means for circulating either a cooling fluid through the sizing mandrel to contract its shaped body or a heating fluid through the sizing mandrel to expand its shaped body.

21. The sizing apparatus of claim 20, wherein the system for circulating a temperature modifying fluid through the sizing mandrel comprises means for cycling the temperature modifying fluid through the interior of the sizing mandrel and out into the interior of the chamber, then returning the fluid from the chamber to the flow propelling means and to the cooling or heating means for recycling it through the sizing mandrel.

22. The sizing apparatus of claim 20, wherein the sizing mandrel is supported substantially vertical with its lower end positioned at a base within the chamber and the duct passing through the interior of said mandrel is in fluid communication at its lower end with the circulation system for circulation of the temperature modifying fluid through the interior the sizing mandrel.

23. The sizing apparatus of claim 20, wherein the sizing mandrel is provided with sensors to measure and indicate its temperatures.

24. The sizing apparatus of claim 20, wherein the chamber is provided with independent heating means.

25. The sizing apparatus of claim 20, wherein the chamber is provided with an encircling shroud surrounding the sizing mandrel.

26. An apparatus for accurately sizing open-ended metal circumferential enclosures, consisting essentially of the combination of:
(a) a closed chamber for heating and cooling;
(b) a multiplicity of aptly and accurately shaped sizing mandrel supported substantially vertically enclosed within the chamber and positioned at this lower end to a base of the chamber, said sizing mandrels having at least one duct passing the length thereof through their interior to provide a passage for a temperature modifying fluid whereby the mandrel can be cooled to contract its shaped body or heated to expand its shaped body;
(c) a system for circulating a temperature modifying fluid through said sizing mandrels including a circulating conduit in fluid connection with the ducts passing through the sizing mandrels and having fluid flow propelling means and cooling and heating means for circulating either a cooling fluid through the sizing mandrels to contract these shaped bodies or a heating fluid through the sizing mandrels to expand their shaped bodies, and cycling the temperatures modifying fluid from the sizing mandrels through the chamber and around through the circulating system for return through the sizing mandrels.

* * * * *

UNITED STATES PATENT AND TRADEMARK OFFICE
CERTIFICATE OF CORRECTION

PATENT NO. : 4,989,433
DATED : 5 February 1991
INVENTOR(S) : John L. Harmon et al It is certified that error appears in the above—identified patent and that said Letters Patent is hereby corrected as shown below:

On the title page please insert item [73] Assignee:
-- Assignee: General Electric Company --.

Signed and Sealed this

Fourteenth Day of July, 1992

Attest:

DOUGLAS B. COMER

*Attesting Officer*  *Acting Commissioner of Patents and Trademarks*